United States Patent
Nampo

(10) Patent No.: US 12,045,526 B2
(45) Date of Patent: Jul. 23, 2024

(54) PRINTER INCLUDING MEMORY CONFIGURED TO STORE FIRST PRINT DATA AND SECOND PRINT DATA GENERATED BASED ON CODE INFORMATION IN MEMORY

(71) Applicant: BROTHER KOGYO KABUSHIKI KAISHA, Nagoya (JP)

(72) Inventor: Hiromichi Nampo, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/463,239

(22) Filed: Sep. 7, 2023

(65) Prior Publication Data
US 2024/0086127 A1    Mar. 14, 2024

(30) Foreign Application Priority Data

Sep. 14, 2022 (JP) .................. 2022-146443

(51) Int. Cl.
*G06F 3/12* (2006.01)
*B41J 3/407* (2006.01)

(52) U.S. Cl.
CPC .......... *G06F 3/1257* (2013.01); *B41J 3/4075* (2013.01); *G06F 3/1204* (2013.01); *G06F 3/1243* (2013.01); *G06F 3/126* (2013.01); *G06F 3/1267* (2013.01); *G06F 3/1273* (2013.01)

(58) Field of Classification Search
CPC .... G06F 3/1257; G06F 3/1204; G06F 3/1243; G06F 3/126; G06F 3/1267; G06F 3/1273; B41J 3/4075
See application file for complete search history.

(56) References Cited

U.S. PATENT DOCUMENTS

| 2008/0292381 A1* | 11/2008 | Tanjima | B41J 3/4075 400/76 |
| 2015/0036162 A1* | 2/2015 | Belbin | G06F 3/1285 358/1.13 |
| 2017/0253027 A1* | 9/2017 | Kanda | B41J 2/04586 |

FOREIGN PATENT DOCUMENTS

| JP | 2003-128473 A | 5/2003 |
| JP | 2008-27384 A | 2/2008 |
| JP | 2008-290319 A | 12/2008 |

* cited by examiner

*Primary Examiner* — Iriana Cruz
(74) *Attorney, Agent, or Firm* — KENEALY VAIDYA LLP

(57) ABSTRACT

A printer includes: a print head configured to perform printing; and a controller configured to control the print head, wherein the controller executes: code acquisition process of acquiring code information obtained from an identification code, specifying process of specifying, based on the code information, first print data and second print data different from the first print data, and printing process of printing a first label based on the first print data specified in the specifying process and printing a second label based on the second print data specified in the specifying process by controlling the print head.

6 Claims, 10 Drawing Sheets

PRINTER INCLUDING MEMORY CONFIGURED TO STORE FIRST PRINT DATA AND SECOND PRINT DATA GENERATED BASED ON CODE INFORMATION IN MEMORY

REFERENCE TO RELATED APPLICATIONS

This application claims priority from Japanese Patent Application No. 2022-146443 filed on Sep. 14, 2022. The entire content of the priority application is incorporated herein by reference.

BACKGROUND ART

The present disclosure relates to a printer.

A printer in the related art stores print history information of at least one piece of printed document data out of document data created by a main body of the printer and document data created by an external device such as a PC, and then can reprint the document data based on the print history information.

DESCRIPTION

In the printer in the related art, when a plurality of types of document data (print data) are to be reprinted, a user needs to designate each target print data, which is rather troublesome.

An object of the present disclosure is to provide a printer that improves user convenience in printing a plurality of pieces of print data as compared with the related art.

A printer according to an aspect of the present disclosure includes a print head and a controller. The controller executes code acquisition process of acquiring code information obtained from one read identification code, specifying process of specifying, based on the code information, first print data and second print data different from the first print data, and printing process of printing a first label based on the first print data specified in the specifying process and printing a second label based on the second print data specified in the specifying process by driving the print head. The printer can specify the first print data and the second print data based on one read identification code. The printer can save the user the trouble of individually specifying the first print data and the second print data. The printer can improve user convenience in printing a plurality of pieces of print data as compared with the related art.

FIG. 1 is a perspective view of a printer 1 of a first specific example with a cover 6 opened and a cassette 30 that is detachable from the printer 1.

Hereinafter, an embodiment of the present disclosure will be described in order with reference to the drawings. In the following description, left, right, front, rear, up, and down directions indicated by arrows are used.

Figure 1:
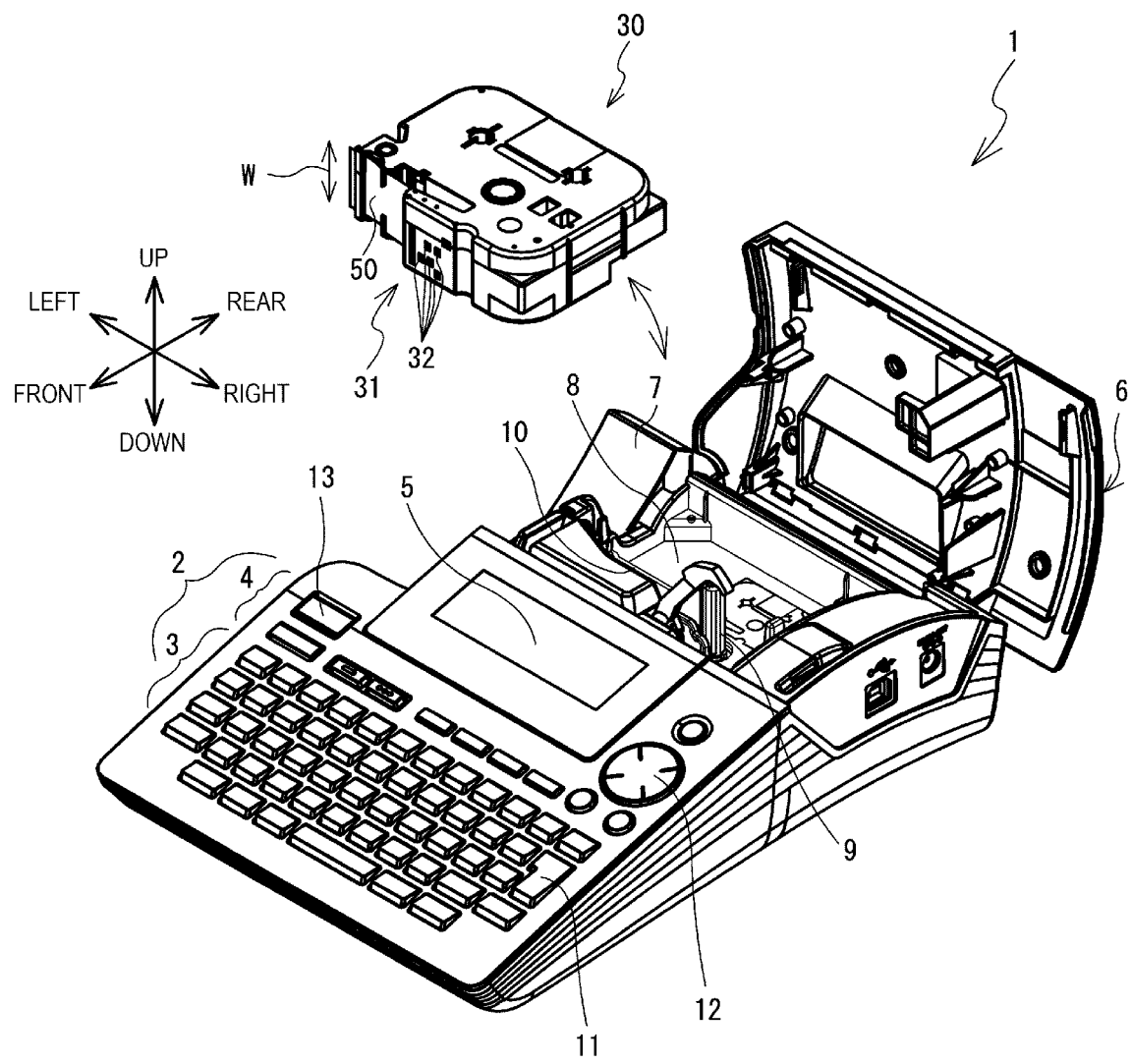

A printer 1 according to a first specific example will be described with reference to FIG. 1. As shown in FIG. 1, the printer 1 of the first specific example is a label printer capable of printing a printing target such as characters (letters, symbols, numbers, and the like) on a tape-shaped medium 50. A user of the printer 1 uses the printer 1, for example, while the printer 1 is placed on a desk. A keyboard 3 including an Enter key 11 is provided on an upper surface of the printer 1 for inputting a printing target. A function key group 4 including a power key, an enter key, a print key, up, down, left, and right keys 12, and an angle setting key 13 is provided on a rear side of the keyboard 3. In the following description, the function key group 4 and the keyboard 3 are collectively referred to as an operation unit 2. A display unit 5 for displaying an input printing target is provided on a rear side of the function key group 4. The display unit 5 is, for example, a dot matrix LCD. An openable cover 6 is provided at a rear portion of the upper surface of the printer 1. The cover 6 can be opened and closed about a left-right direction of a rear end portion of the cover 6. A tape tray 7 that receives the cut printed medium 50 is provided at a rear left corner of the printer 1.

A cassette attachment portion 8 is provided on a rear side of the display unit 5. A cassette 30 is attached to and detached from the cassette attachment portion 8 in an up-down direction. The medium 50 and an ink ribbon (not shown) are wound and stored inside the cassette 30. The medium 50 is, for example, a label tape in which a release sheet is provided on one surface and the release sheet can be peeled off and attached to another object. The cassette attachment portion 8 of the printer 1 is provided with a ribbon wind-up shaft 9, a tape drive shaft (not shown), a platen roller (not shown), a print head 10, and the like. The ribbon wind-up shaft 9 winds up the ink ribbon. The tape drive shaft conveys the medium 50. The print head 10 performs printing by heating the ink ribbon.

When the printer 1 performs printing, the medium 50 is conveyed by the tape drive shaft and the platen roller while the ink ribbon is pulled out by the ribbon wind-up shaft 9. While the medium 50 and the ink ribbon are pressed against the print head 10 by the platen roller, the print head 10 prints on the medium 50 via the ink ribbon. The printed medium 50 is cut by a moving blade (not shown) provided on a conveyance path of the medium 50, and is discharged to the outside of the printer 1.

Various cassettes 30 can be attached to the cassette attachment portion 8. The cassette 30 includes an indicator portion 31 indicating a type of the cassette 30. The indicator portion 31 includes at least one hole 32 provided in a prescribed pattern according to a type of tape. Each hole 32 is provided at a position corresponding to one of five detection switches (not shown) included in a detector 23 (see FIG. 2) provided in the printer 1. Thus, when the cassette 30 is attached to the printer 1, the detection switches are selectively pressed by the indicator portion 31. In the printer 1, the type of the cassette 30 is detected based on the combination of ON/OFF of the detection switches at this time.

Figure 2:
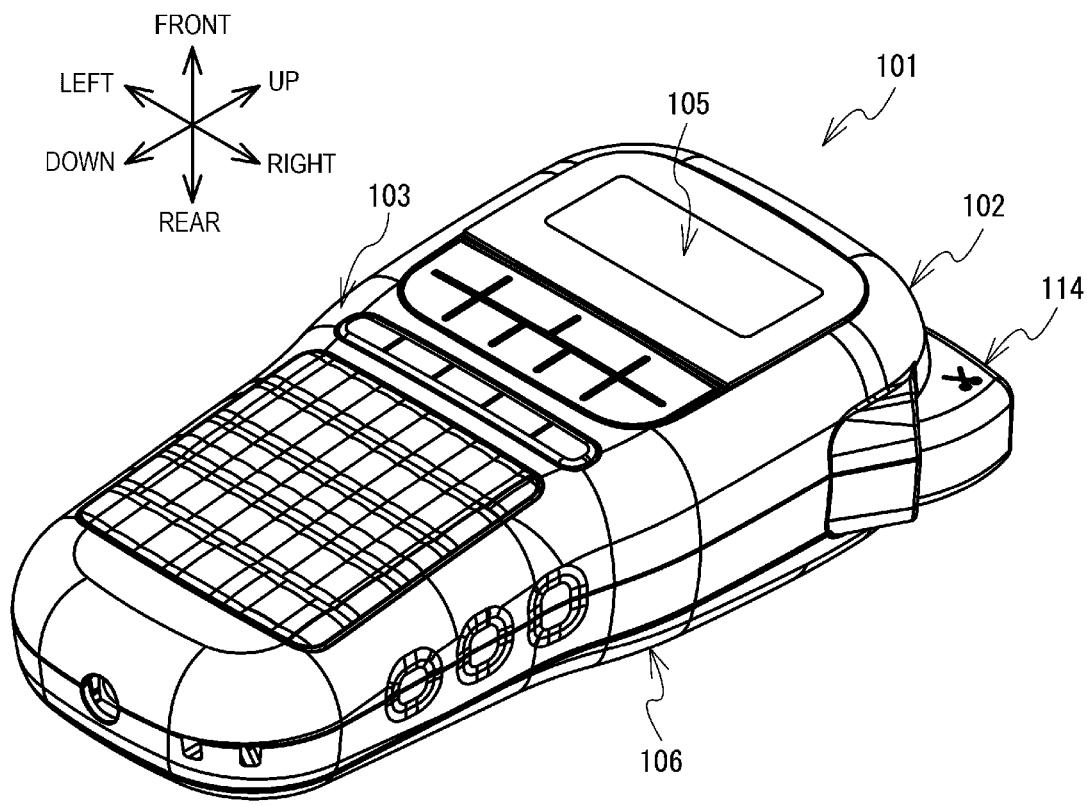
FIG. 2 is a perspective view of a printer 101 of a second specific example as viewed from a front side.

A printer 101 according to a second specific example will be described with reference to FIG. 2. As shown in FIG. 2, the printer 101 of the second specific example is a label printer capable of printing a printing target on the medium 50 of the cassette 30 (see FIG. 1), similar to the printer 1 of the first specific example. A user of the printer 101 uses the printer 101, for example, while holding the printer 101 by hand. The printer 101 includes a main body cover 102, an operation unit 103, a display unit 105, a cassette cover 106, and an operation unit 114. The main body cover 102 is a rectangular parallelepiped housing. The operation unit 103 is an input device provided on a front portion of an upper surface of the main body cover 102 and for inputting a printing target and various instructions. The operation unit 103 is, for example, a keyboard. The operation unit 103 includes a power switch, a usage key, a cursor key, and the like. The display unit 105 is a display device that is provided on an upper side of the operation unit 103 and displays various types of information. The display unit 105 is, for example, a dot matrix LCD. The cassette cover 106 is a cover that is provided on a rear side of the display unit 105 and can be opened with respect to the main body cover 102. A discharge port (not shown) for discharging the printed medium 50 to the outside of the main body cover 102 is formed on the upper surface of the main body cover 102. The operation unit 114 is provided at an upper right corner of the main body cover 102. When the operation unit 114 is pressed inward, the printed tape is cut.

Figure 3:
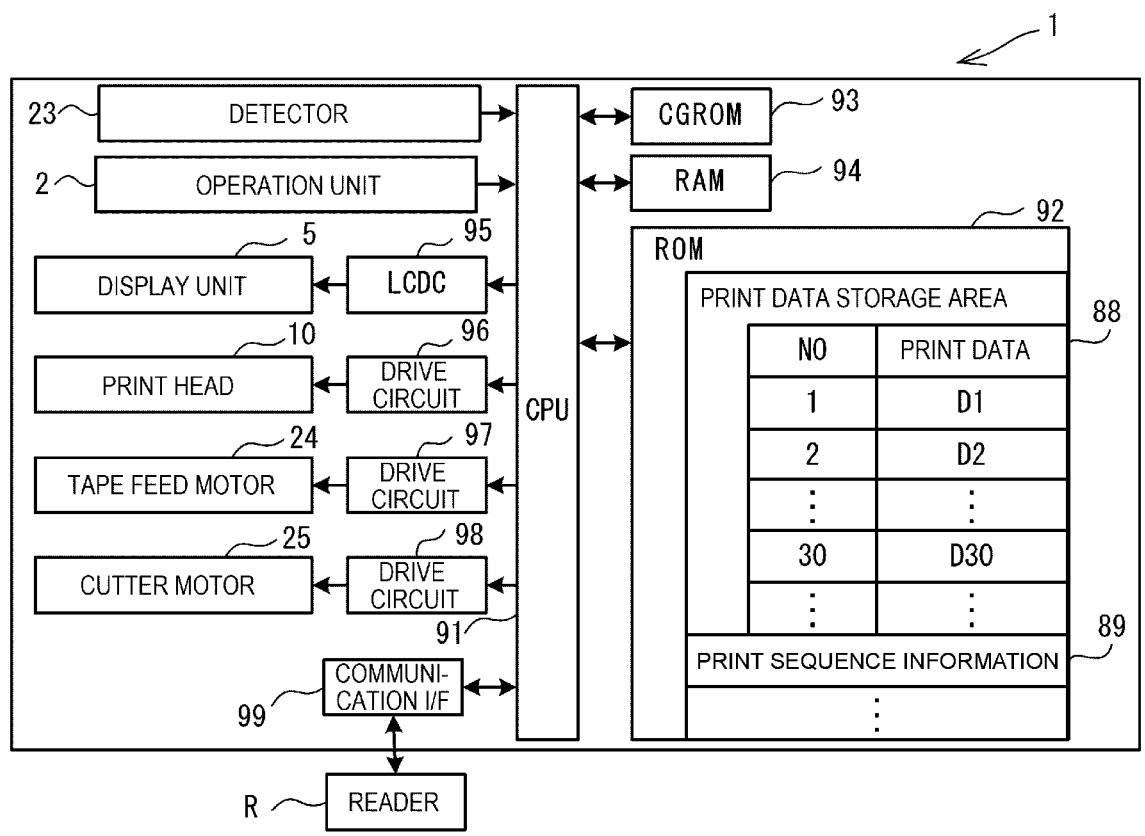
FIG. 3 is a block diagram showing an electrical configuration of the printer 1.

An electrical configuration of the printer 1 of the first specific example will be described with reference to FIG. 3. As shown in FIG. 3, the printer 1 includes a CPU 91, a ROM 92, a CGROM 93, a RAM 94, and a communication I/F 99. The ROM 92, the CGROM 93, the RAM 94, and the communication I/F 99 are each electrically connected to the CPU 91.

The ROM 92 stores various programs and the like necessary for controlling the printer 1. The CPU 91 performs various calculations based on the programs stored in the ROM 92. The ROM 92 further includes a print data storage area 88 and a print sequence storage area 89. The print data storage area 88 stores print data in association with an ID for identifying the print data. The print sequence storage area 89 stores print sequence information representing a print sequence of a plurality of pieces of print data including first print data and second print data when the plurality of pieces of print data are printed. The second print data is different from the first print data.

Figure 4:
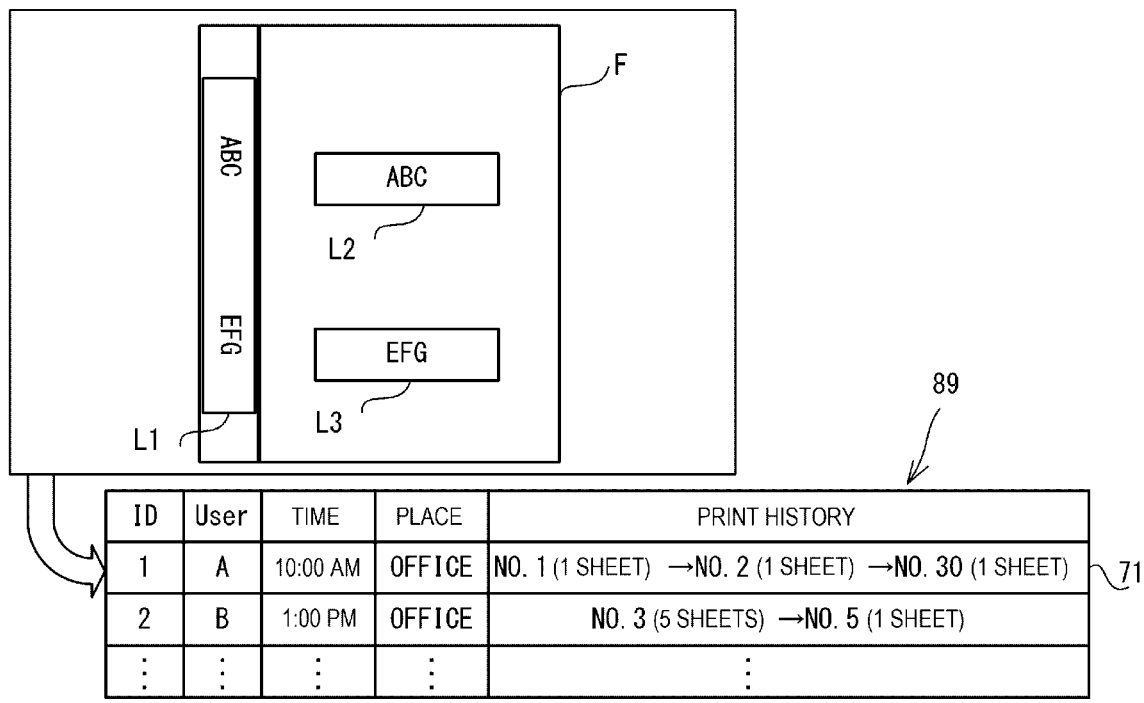
FIG. 4 is an explanatory diagram of a print sequence storage area 89 of the printer 1 of the first specific example.

The print sequence information of the printer 1 of the first specific example includes information identifying a user, time, place, IDs of the plurality of pieces of print data including the first print data and the second print data, printing order, and the number of copies. For example, as shown in FIG. 4, in a case where a user A executes second printing process to be described later in an office at around 10:00 AM, and continuously prints a label L1 to be affixed to a spine of a file F and labels L2 and R3 to be affixed to a cover of the file F, the printer 1 stores print sequence information 71 according to a user instruction. The print sequence information 71 includes an ID "No. 1" of first print data D1 for printing the label L1 and the printing order 1 and the number of copies 1 of the label L1, an ID "No. 2" of second print data D2 for printing the label L2 and the printing order 2 and the number of copies 1 of the label L2, and an ID "No. 30" of third print data D30 for printing the label L3 and the printing order 3 and the number of copies 1 of the label L3. The printer 1 can read each of the first print data D1, the second print data D2, and the third print data D30 stored in the print data storage area 88 by specifying the print sequence information 71 based on code information in first printing process to be described later.

In the CGROM 93 shown in FIG. 3, printing dot pattern data for printing various printing targets are classified by format and size and stored in association with code data. The RAM 94 is provided with a plurality of storage areas such as a text memory and a print buffer. The text memory stores data to be printed input from the keyboard 3. The print buffer stores a print dot pattern to be printed. The communication I/F 99 is an interface that enables wired or wireless communication with an external device. The external device is, for example, a reader R that reads an identification code. The identification code may be, for example, a one-dimensional code or a two-dimensional code. The one-dimensional code may be, for example, a bar code. The two-dimensional code may be a QR code (registered trademark), a VeriCode, a CP code, an Aztec Code, PDF 417, or the like. In this case, the reader R is, for example, a bar code reader. The identification code may be a string of characters and graphics, in which case the reader R is, for example, a camera. The identification code of the present embodiment is a two-dimensional code.

The printer 1 further includes the detector 23, the operation unit 2, a liquid crystal drive circuit (LCDC) 95, and drive circuits 96 to 98. The detector 23, the operation unit 2, the LCDC 95, and the drive circuits 96 to 98 are electrically connected to the CPU 91. The detector 23 outputs, to the CPU 91, a signal corresponding to the type of the cassette 30 attached to the cassette attachment portion 8. The drive circuit 96 is an electronic circuit for driving the print head 10. The drive circuit 97 is an electronic circuit for driving a tape feed motor 24 for rotating the ribbon wind-up shaft 9 (see FIG. 1) and the tape drive shaft (not shown). The drive circuit 98 is an electronic circuit for driving a cutter motor 25 that operates the movable blade (not shown) that cuts the printed medium 50 to be discharged to the outside of the printer 1. The LCDC 95 is an electronic circuit for outputting a printing target to the display unit 5.

Figure 5:
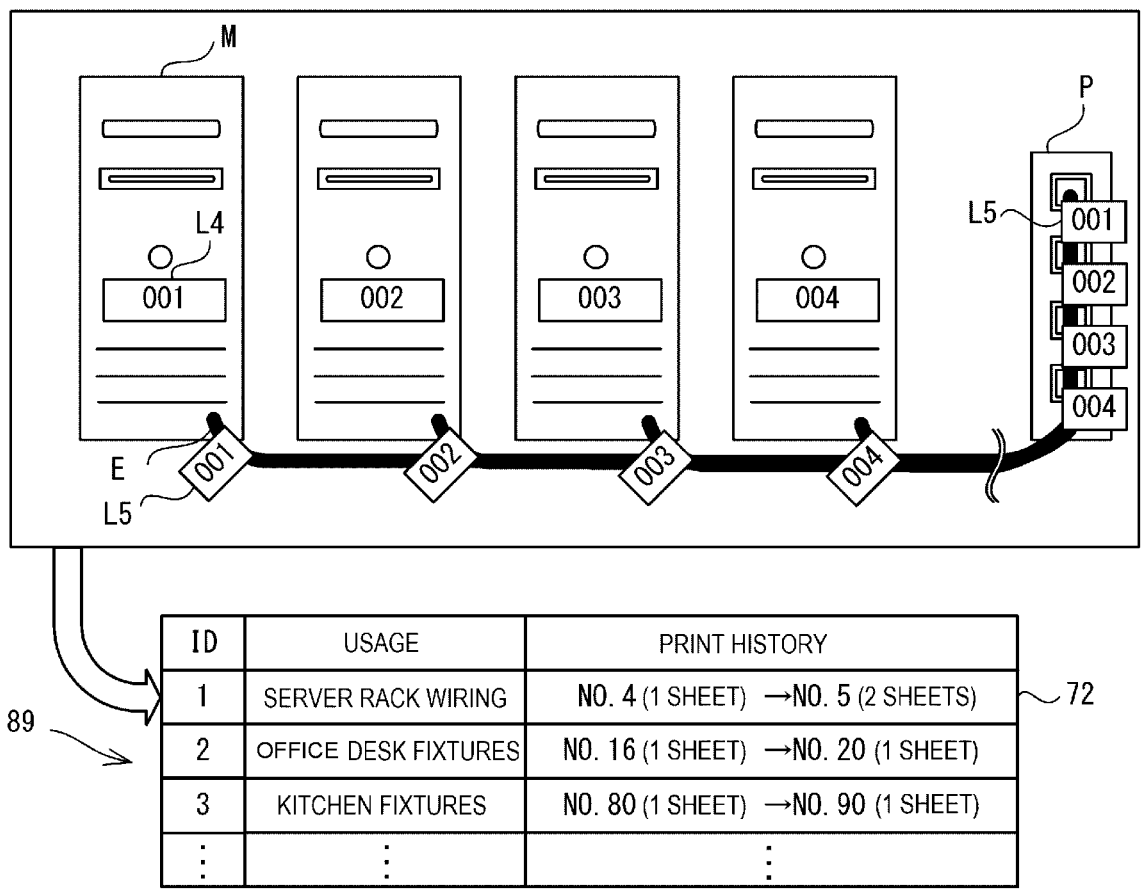
FIG. 5 is an explanatory diagram of the print sequence storage area 89 of the printer 101 of the second specific example.

The electrical configuration of the printer 101 of the second specific example is the same as the electrical configuration of the printer 1 of the first specific example, and the description thereof is omitted. The display unit 105 corresponds to the display unit 5 of the printer 1 of the first specific example. The operation unit 103 corresponds to the operation unit 2 of the printer 1 of the first specific example. Print sequence information stored in the ROM 92 of the printer 101 of the second specific example includes the usage of label, IDs of a plurality of pieces of print data including first print data and second print data, a printing order, and the number of copies. For example, as shown in FIG. 5, as labels to be affixed to server rack wiring, when a label L4 to be affixed to a front surface of a server M and labels L5 to be affixed to both ends of a cable E connecting the server M and a rack P are continuously printed, the printer 101 stores the print sequence information 72 according to a user instruction. The print sequence information 72 includes an ID "No. 4" of first print data D4 for printing the label L4 and the printing order 1 and the number of copies 1 of the label L4, and an ID "No. 5" of second print data D5 for printing the label L5 and the printing order 2 and the number of copies 2 of the label L5. The label L4 and label L5 are used to assign serial identification numbers to a plurality of servers including the server M. The printer 101 receives input of a start number and the number of servers, and can sequentially print the label L4 and label L5 corresponding to each of the servers in combination.

The first printing process executed by each of the CPU 91 of the printer 1 of the first specific example and the CPU 91 of the printer 101 of the second specific example will be described with reference to FIGS. 4 to 9. The first printing process is the process of specifying, based on code information obtained from one identification code read by the reader R, a plurality of pieces of print data including the first print data and the second print data, and printing according to the specified plurality of pieces of print data. Hereinafter, the step is abbreviated as S. After the power is turned on, the CPU 91 reads a program stored in the ROM 92 to the RAM 94. The CPU 91 executes the first printing process including the following steps according to instructions included in the program read out to the RAM 94. Various types of data obtained in the first printing process are stored in the RAM 94 as appropriate. The first printing process of the printer 1 of the first specific example and the first printing process of the printer 101 of the second specific example are executed by different devices at different timings, but will be described in parallel to simplify the description.

The CPU 91 determines whether code information obtained from one identification code read by the reader R is received (S1). The reader R may output, to the corresponding printers 1, 101, image data obtained by reading the identification code as code information, or may output, to the corresponding printers 1, 101, code information obtained by decoding the image data obtained by reading the identification code as code information. In the first specific example, the user causes the reader R to read one identification code C1 of FIG. 8A and output code information J1 to the printer 1. In the second specific example, the user causes the reader R to read one identification code C2 of FIG. 8B and output code information J2 to the printer 101. When the code information is received (S1: YES), the CPU 91 acquires the code information received from the reader R (S2). In S2, when the image data representing the identification code is received from the reader R, information obtained by decoding the received image data is acquired as code information. When information obtained by decoding the image data representing the identification code is received from the reader R, the received information is acquired as code information. The CPU 91 analyzes the acquired code information (S3).

Figure 8A:
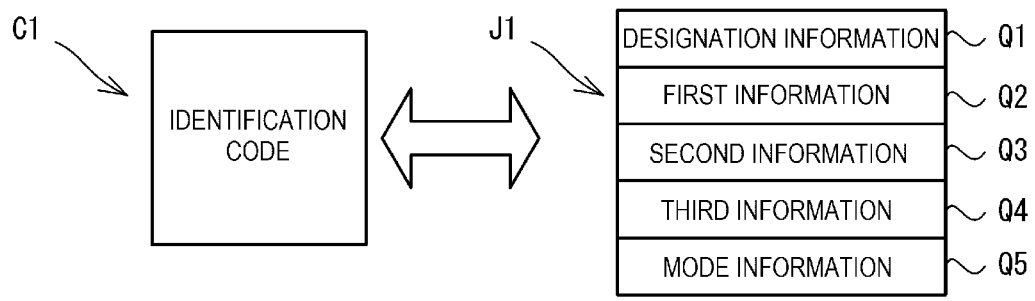
FIG. 8A is an explanatory diagram of an identification code C1 and code information J1 of the first specific example.

As shown in FIG. 8A, in the first specific example, the CPU 91 analyzes the code information J1 obtained by reading the one identification code C1 with the reader R. The code information J1 of the first specific example includes designation information Q1 for designating a print sequence of the first print data D1, the second print data D2, and the third print data D30. The designation information Q1 is, for example, an ID of the print sequence information 71. The code information of the present embodiment includes first information for generating the first print data and second information for generating the second print data. The code information J1 of the first specific example includes first information Q2 for generating the first print data D1, second information Q3 for generating the second print data D2, and third information Q4 for generating the third print data D30. The first information Q2, the second information Q3, and the third information Q4 may be any information for generating the print data, and includes, for example, information specifying the content and arrangement of objects, and the size of margins. The code information J1 includes mode information for designating a method of storing, in the ROM 92, the first print data D1, the second print data D2, and the third print data D30 specified based on the code information J1.

Figure 8B:
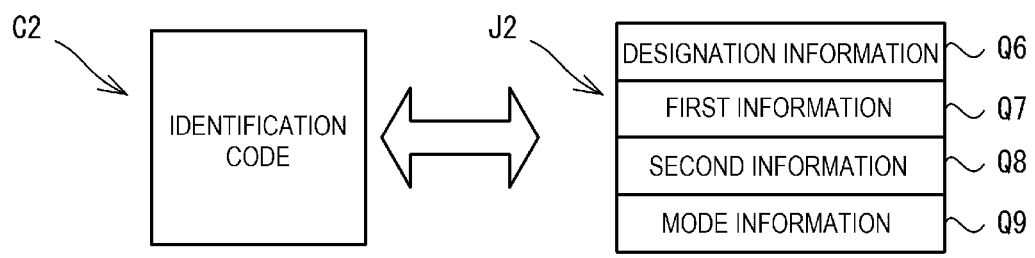
FIG. 8B is an explanatory diagram of an identification code C2 and code information J2 of the second specific example.

As shown in FIG. 8B, in the second specific example, the CPU 91 analyzes the code information J2 obtained by reading the one identification code C2 with the reader R as in the first specific example. The code information J2 of the second specific example includes designation information Q6 for designating a print sequence of the first print data D4 and the second print data D5. The designation information Q6 is, for example, an ID of the print sequence information 72. The code information J2 of the second specific example includes first information Q7 for generating the first print data D4 and second information Q8 for generating the second print data D5. The code information J2 includes mode information Q9.

The CPU 91 develops the print sequence information currently stored in the ROM 92 to the RAM 94 (S4). The CPU 91 determines whether each of the plurality of pieces of print data designated based on first print sequence information specified by the code information is stored in the ROM 92 (S5: YES). As shown in the print data storage area 88 of FIG. 3, in the first specific example, the CPU 91 determines that each of the first print data D1, the second print data D2, and the third print data D30 specified based on the print sequence information 71 is stored in the ROM 92 (S5: YES). The CPU 91 specifies, based on the code information J1, the first print data D1, the second print data D2, and the third print data D30 from the plurality of pieces of print data stored in the ROM 92, and displays a screen G1 including the print sequence information 71 sorted according to the printing order on the display unit 5 (S16).

Figure 9:
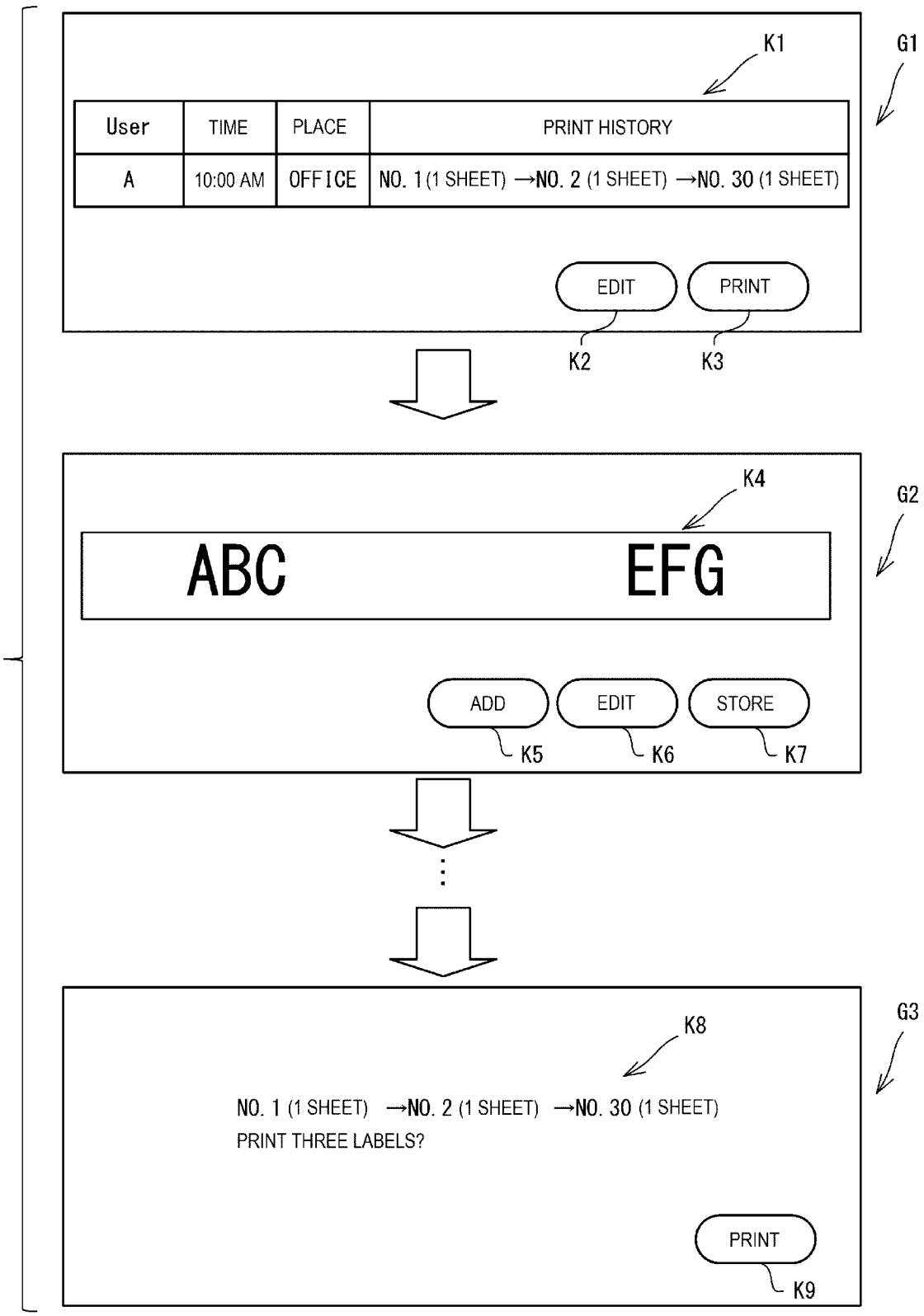
FIG. 9 is an explanatory diagram of screens G1 to G3.

As shown in FIG. 9, the screen G1 includes a field K1 and keys K2 and K3. The field K1 displays the print sequence information 71. In the field K1, the IDs of the print data are displayed from left to right according to the printing order. In the field K1, the number of copies is displayed in parentheses on a right side of the ID of each print data. The key K2 is selected to input an instruction to edit any one of the first print data D1, the second print data D2, and the third print data D30 specified by the ID of the print data included in the print sequence information 71. The key K3 is selected to input an instruction to print the first print data D1, the second print data D2, and the third print data D30 specified by the print sequence information 71 according to the printing order. The CPU 91 returns the process to S1.

As shown in the print data storage area 88 of FIG. 3, in the second specific example, the CPU 91 determines that neither the first print data D4 nor the second print data D5 specified based on the code information J2 is stored in the ROM 92 (S5: NO). The CPU 91 specifies by generating the first print data D4 for printing the label L4 based on the first information Q7, and by generating the second print data D5 for printing the label L5 based on the second information Q8 (S7 to S16). Specifically, the CPU 91 determines whether the ROM 92 has a capacity for newly storing the first print data D4 and the second print data D5 (S6). When the identification code C2 includes information indicating the capacity of the plurality of pieces of the print data D4 and D5, the CPU 91 may perform the process of S6 based on the information. When the identification code C2 does not include the information indicating the capacity of the plurality of pieces of the print data D4 and D5, the CPU 91 may perform the process of S6 based on an average capacity of the print data.

When the ROM 92 has a capacity for newly storing the print data (S6: YES), the CPU 91 reconstructs the first print data D4 based on the first information Q7, reconstructs the second print data D5 based on the second information Q8, and stores the first print data D4 and the second print data D5 in the ROM 92 (S7). The CPU 91 specifies a plurality of pieces of print data including the generated first print data D4 and second print data D5, sorts the print data according to the printing order, and displays a screen similar to the screen G1 of FIG. 9 on the display unit 105 (S16). The CPU 91 returns the process to S1.

When the ROM 92 has no capacity for storing the new first print data D4 and second print data D5 (S6: NO), the CPU 91 determines whether the new first print data D4 and second print data D5 can be temporarily stored in the RAM 94 (S8). In the second specific example, the CPU 91 determines that the new print data can be temporarily stored in the RAM 94 (S8: YES), and the CPU 91 reconstructs the first print data D4 for printing the label L4 based on the first information Q7, reconstructs the second print data D5 for printing the label L5 based on the second information Q8, and develops the first print data D4 and the second print data D5 to the RAM 94 (S9). In this case, the CPU 91 does not store the first print data D4 and the second print data D5 in the ROM 92. The CPU 91 specifies the generated print data, sorts the print data according to the printing order, and displays a screen similar to the screen G1 of FIG. 9 on the display unit 5 (S16). The CPU 91 returns the process to S1.

When the new first print data D4 and second print data D5 cannot be temporarily stored in the RAM 94 (S8: NO), the CPU 91 checks an insufficient data capacity when storing the new first print data D4 and second print data D5 in the ROM 92 (S10). The CPU 91 generates a generation identification code including information for generating one or more pieces of print data stored in the ROM 92 for the insufficient data capacity (S11). The CPU 91 may appropriately determine a method for selecting the print data for generating the generation identification code from the print data stored in the ROM 92. For example, the CPU 91 may select the print data for which the generation identification code is to be generated in consideration of a print frequency, the data capacity, and the like. More specifically, the CPU 91 may select the print data of a data capacity that is insufficient when storing the first print data D4 and the second print data D5 in the ROM 92 in ascending order of the print frequency. Similarly to the identification code, the generation identification code may be, for example, a one-dimensional code or a two-dimensional code. The CPU 91 may generate the generation identification code by a method corresponding to a type of the generation identification code.

The CPU 91 drives the print head 10 to print the generation identification code generated in S11 on a label (S12). The CPU 91 determines whether the generation identification code is normally printed in the process of S12 (S13). A method for determining whether the generation identification code is normally printed may be determined as appropriate. For example, when no error is detected during printing, the CPU 91 may determine that the generation identification code is normally printed. In another example, the CPU 91 may determine whether the generation identification code is normally printed based on whether the printed generation identification code is normally read by the reader R. In another example, the CPU 91 may receive a visual judgment result by the user to determine whether the generation identification code is normally printed.

When the generation identification code is not normally printed in S12 (S13: NO), the CPU 91 returns the process to S12 and prints the generation identification code again (S12). When the generation identification code is normally printed in S12 (S13: YES), the CPU 91 deletes the print data corresponding to the generation identification code selected in S11 (S14). The CPU 91 reconstructs the first print data D4 based on the first information Q7 included in the code information J2 acquired in S2, reconstructs the second print data D5 based on the second information Q8 included in the code information J2 acquired in S2, and stores the generated first print data D4 and second print data D5 in the ROM 92 (S15). The CPU 91 specifies the generated first print data D4 and second print data D5, sorts the print data according to the printing order, and displays a screen similar to the screen G1 of FIG. 9 on the display unit 5 (S16). The CPU 91 returns the process to S1.

Figure 7:
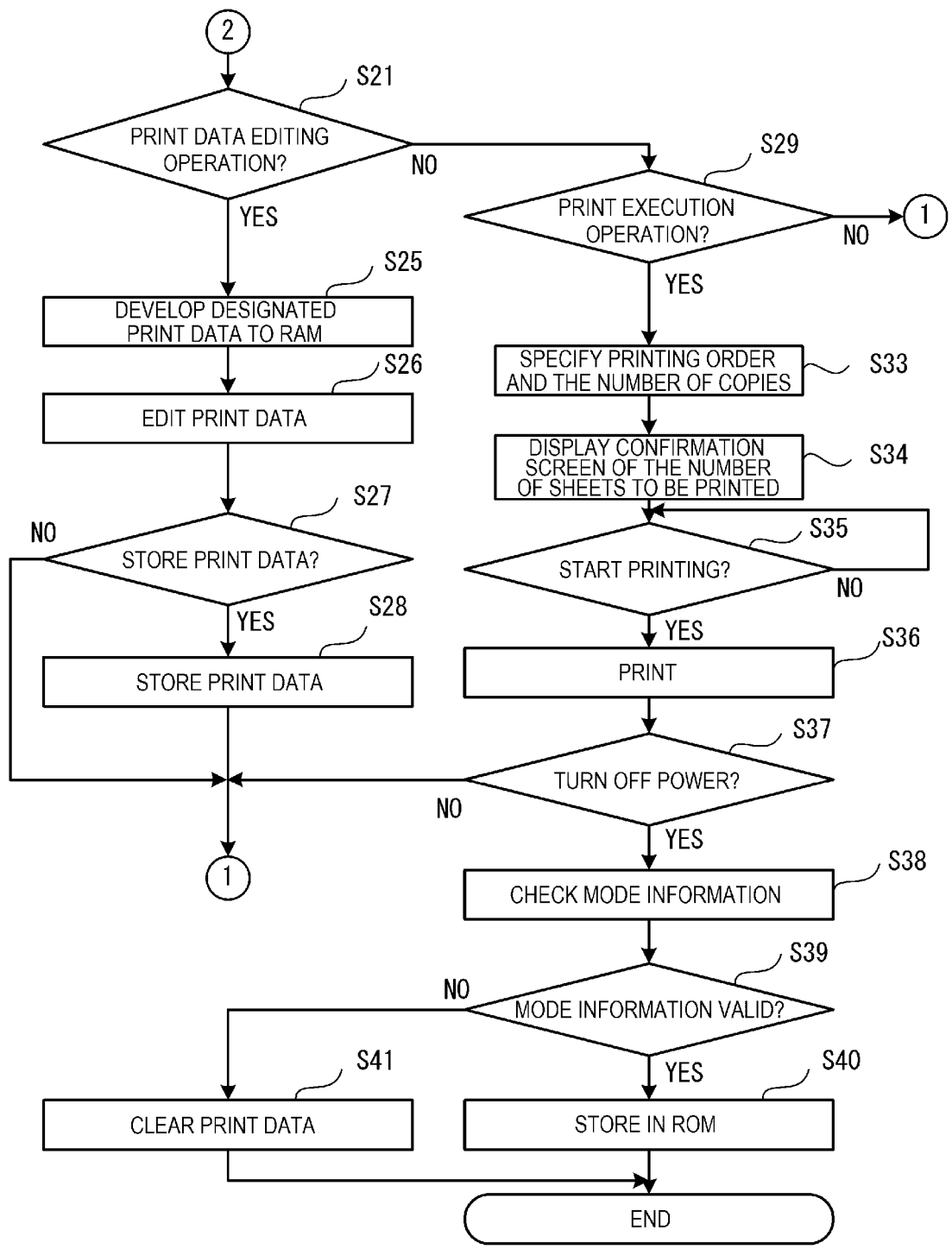
FIG. 7 is a part of a flowchart of the first printing process.

When the code information is not received (S1: NO), as shown in FIG. 7, the CPU 91 determines whether a print data editing operation is detected (S21). The following process will be described using the first specific example as an example. The process in the second specific example is also executed in the same manner. When the key K2 on the screen G1 is selected, the CPU 91 detects the print data editing operation. When the print data editing operation is detected (S21: YES), the CPU 91 develops the designated print data to the RAM 94 (S25). When the first print data D1 is designated as the print data to be edited, the CPU 91 displays an edit screen G2 of FIG. 9 on the display unit 5, and edits the print data according to the instruction (S26). The edit screen G2 includes a field K4 and keys K5 to K7. The field K4 displays a print image of the designated first print data D1. The key K5 is selected to instruct the addition of an object. The key K6 is selected to edit the selected object. The object is selected from characters and graphics. Editing includes deleting objects, changing character fonts and sizes, changing character decorations such as bold and underlining, changing character placement, and the like. The key K7 is selected to input an instruction to store the edited print data in the ROM 92. The CPU 91 determines whether to store the print data edited in S26 in the ROM 92 (S27). When the selection of the key K7 is detected and the print data edited in S26 is stored in the ROM 92 (S27: YES), the CPU 91 stores the print data in the ROM 92 (S28). When the selection of the key K7 is not detected and the print data edited in S26 is not stored in the ROM 92 (S27: NO), or after S28, the CPU 91 displays the screen G1 on the display unit 5 again and returns the process to S1.

When the print data editing operation is not detected (S21: NO), the CPU 91 determines whether a print execution operation is detected (S29). When the key K3 on the screen G1 is selected, the CPU 91 detects the print execution operation. When the print execution operation is not detected (S29: NO), the CPU 91 returns the process to S1. When the print execution operation is detected (S29: YES), the CPU 91 specifies, based on the code information J1, the order of printing the label L1 based on the first print data D1, the order of printing the label L2 based on the second print data D2, the order of printing the label L3 based on the third print data D30, and the number of copies of the labels L1 to L3 for the first print data D1, the second print data D2, and the third print data D30 specified in S16 (S33). The CPU 91 displays a confirmation screen G3 of the number of sheets to be printed on the display unit 5 (S34). As shown in FIG. 9, the confirmation screen G3 of the number of sheets to be printed includes a field K8 and a key K9. The field K displays the ID and the number of copies of the first print data D1, the ID and the number of copies of the second print data D2, and the ID and the number of copies of the third print data D30 according to the printing order, and further displays the number of labels to be printed in total, that is, the number of sheets to be printed. The key K9 is selected to input an instruction to print the first print data D1, the second print data D2, and the third print data D30 according to the printing order. After confirming the ID of the print data, the printing order, the number of copies, and the number of sheets to be printed on the confirmation screen G3 of the number of sheets to be printed, the user selects the key K9.

The CPU 91 determines whether an instruction to start printing is detected (S35). When the selection of the key K9 is detected, the CPU 91 detects an instruction to start printing. The CPU 91 waits until an instruction to start printing is detected (S35: NO). When an instruction to start printing is detected (S35: YES), the CPU 91 drives the print head 10 to print the label L1 based on the first print data D1, the label L2 based on the second print data D2, and the label L3 based on the third print data D30 (S36). In a case where the first print data D is edited in S26, the CPU 91 drives the print head 10 to print the label L1 based on the edited first print data D1 when the first print data D1 is to be printed first (S36). Based on the printing order specified in S33, the CPU 91 performs printing of the label L1 based on the first print data D1 in preference to the printing of the label L2 based on the second print data D2 and the label L3 based on the third print data D30 (S36). That is, the CPU 91 prints a plurality of pieces of print data specified based on the code information in the printing order designated by the code information.

The CPU 91 determines whether an instruction to turn off the power is detected (step S37). When the instruction to turn off the power is not detected (S37: NO), the CPU 91 returns the process to S1. When the instruction to turn off the power is detected (S37: YES), the CPU 91 checks the mode information included in the code information (S38). The CPU 91 determines whether the mode information confirmed in S38 is valid (S39). When the mode information is valid (S39: YES), the CPU 91 stores the plurality of pieces of print data printed in S36 in the ROM 92 (S40). When the ROM 92 does not have sufficient capacity to store the plurality of pieces of print data, the plurality of pieces of print data printed in S36 may be stored in the ROM 92 after a part of the print data stored in the ROM 92 is deleted by the same process as in S10 to S15. When the mode information is not valid (S39: NO), the CPU 91 deletes the plurality of pieces of print data printed in S36 (S41). After S40 or S41, the CPU 91 ends the first printing process.

In S35, when an instruction to start printing is detected in the second specific example (S35: YES), the CPU 91 drives the print head 10 to print the label L4 based on the first print data D4 and the label L5 based on the second print data D5 (S36). Based on the printing order specified in S33, the CPU 91 performs printing of the label L4 based on the first print data D4 in preference to the printing of the label L5 based on the second print data D5 (S36). One copy of the label L4 and two copies of the label L5 are printed.

The second printing process executed by the CPU 91 of the printer 1 of the first specific example will be described with reference to FIG. 10. The second printing process is the process of performing printing according to one or more pieces of print data designated by the user. The CPU 91 of the printer 101 of the second specific example can execute the same process. Hereinafter, the step is abbreviated as S. After the power is turned on, the CPU 91 reads a program stored in the ROM 92 to the RAM 94. The CPU 91 executes the second printing process including the following steps according to instructions included in the program read out to the RAM 94. Various types of data obtained in the second printing process are stored in the RAM 94 as appropriate.

The CPU 91 checks a storage setting (S51). The storage setting designates whether to store the print sequence information in the print sequence storage area 89 of the ROM 92 when the CPU 91 prints a plurality of pieces of print data. When the storage setting is valid, the CPU 91 stores the print sequence information in the print sequence storage area 89 of the ROM 92. When the storage setting is invalid, the CPU 91 does not store the print sequence information in the print sequence storage area 89 of the ROM 92. The storage setting may be stored in the ROM 92 in advance or may be set by the user. The CPU 91 reflects the storage setting confirmed in S51 (S52). The CPU 91 enters a starting state in which a user instruction is received via the operation unit 2 (S53). The CPU 91 determines whether a user operation is detected via the operation unit 2 (S54). When the user operation is not detected (S54: NO), the CPU 91 returns the process to S53.

When the user operation is detected (S54: YES), the CPU 91 determines whether a change in the storage setting is detected (S55). The user can input an instruction to change the storage setting by operating the operation unit 2. When the instruction to change the storage setting is detected (S55: YES), the CPU 91 returns the process to S52 and reflects the changed storage setting (S52). When the instruction to change the storage setting is not detected (S55: NO), the CPU 91 determines whether an instruction to print the identification code is detected (S56). The user can input an instruction to print the identification code representing the code information corresponding to the print sequence information stored in the print sequence storage area 89 by operating the operation unit 2. When the instruction to print the identification code is not detected (S56: NO), the CPU 91 determines whether an instruction to print the plurality of pieces of print data is detected (S57). The print data may be data stored in the printer 1, may be acquired from an external device such as a PC, or may be data newly generated according to a user operation. The user designates a plurality of pieces of print data and inputs an instruction to print the plurality of pieces of print data. When the instruction to print a plurality of pieces of print data is not detected (S57: NO), the CPU 91 executes another process according to the user operation detected in S54 (S62), and then returns the process to S53.

When an instruction to print one copy of each of the first print data D1, the second print data D2, and the third print data D30 in this order is detected (S57: YES), the CPU 91 determines whether the first print data D1, the second print data D2, and the third print data D30 for which the printing instruction is detected are already stored in the print sequence storage area 89 (S58). When the print sequence information 71 is not stored in the print sequence storage area 89 (S58: NO), the CPU 91 refers to the storage setting set in S52 and determines whether the storage setting is valid (S59). When the storage setting is valid (S59: YES), the CPU 91 stores the print sequence information 71 in the print sequence storage area 89 of the ROM 92 (S60). The CPU 91 may acquire, from the print sequence information 71, the information specifying the user, the time, and the place via the operation unit 2, or may acquire the information from an external device such as the reader R, a smartphone, or a mobile terminal connected via the communication I/F 99. The CPU 91 prints one copy of each of the first print data D1, the second print data D2, and the third print data D30 in this order (S61). When the print sequence information 71 is already stored in the print sequence storage area 89 (S58: YES), or when the storage setting set in S52 is invalid (S59: NO), the CPU 91 does not perform the process of storing the print sequence information 71 in the ROM 92, and prints one copy of each of the first print data D1, the second print data D2, and the third print data D30 in this order (S61). The CPU 91 returns the process to S53.

When an instruction to print the identification code of the print sequence information 71 is detected (S56: YES), the CPU 91 specifies the print sequence information 71 for which the identification code is to be generated, among the print sequence information stored in the print sequence storage area 89 of the ROM 92 (S63). The CPU 91 calculates a total data size of the code information set based on the print sequence information 71 specified in S63 (S64). The CPU 91 sets information including the designation information Q1, the first information Q2, the second information Q3, the third information Q4, and the mode information Q5 as the code information J1 corresponding to the print sequence information 71, and calculates the sum of data sizes of the set information Q1 to Q5 as the total data size. The CPU 91 determines a standard of the identification code based on the total data size calculated in S64 (S65). The CPU 91 stores a plurality of correspondences between the data size and the standard of the identification code in the ROM 92, and determines a standard capable of including the code information J1 in one identification code from among the correspondences stored in the ROM 92. The standard of the identification code may be set in consideration of a width of the medium 50 of the cassette 30 specified by a signal output from the detector 23, or may be set in consideration of a maximum width of the medium 50 of the cassette 30 that can be attached to the cassette attachment portion 8.

The CPU 91 inserts the designation information Q1 for specifying the print sequence information 71 stored in the ROM 92 at the head of the code information (S66). The CPU 91 inserts the first information Q2, the second information Q3, and the third information Q4, which are the printing information for generating the print data, next to the designation information Q1 of the code information (S67). The CPU 91 inserts the mode information Q5 next to the printing information inserted in S67 (S68). The CPU 91 generates the identification code C1 of the standard determined in S65 that represents the code information J1 including the designation information Q1, the first information Q2, the second information Q3, the third information Q4, and the mode information Q5 (S69). The CPU 91 drives the print head 10 to print the identification code C1 generated in S69 on a label (S70). As in S13, the CPU 91 may detect whether the identification code C1 is normally printed, and may print the identification code C1 again when the identification code C1 is not normally printed. The CPU 91 returns the process to S53. The second printing process ends when the user inputs an end instruction via the operation unit 2 or when the power of the printer 1 is turned off. The user affixes the label printed in S70 to, for example, a shelf in which the file F is stored. When creating the same labels L1 to L3 next time, the user may read one identification code of the label affixed to the shelf by the reader R and cause the printer 1 to acquire the code information and perform the first printing process.

In the second specific example, in a case where the second printing process is executed, when an instruction to print a predetermined number of sets of labels from the start number is detected in S57, with a total of three copies of labels, one copy of the label L4 to be printed based on the first print data D4 and two copies of the label L5 to be printed based on the second print data D5 are used as one set, (S57: YES), the CPU 91 may store the print sequence information 71 in the print sequence storage area 89 of the ROM 92 (S60) when the print sequence information 72 is not stored in the print sequence storage area 89 (S58: NO) and the storage setting is valid (S59: YES). In this case, the CPU 91 may acquire the information specifying the usage from the print sequence information 72 via the operation unit 2, or may acquire the information from an external device such as the reader R, a smartphone, or a mobile terminal connected via the communication I/F 99. The user affixes the label printed in S70 to, for example, a server rack in which the server M is arranged. When creating the same labels L4 and L5 next time, the user may read one identification code of the label affixed to the server rack by the reader R and cause the printer 101 to acquire the code information and perform the first printing process.

In the above embodiment, the printer 1, the print head 10, the CPU 91, and the ROM 92 are examples of the printer, the print head, the controller, and the storage of the present disclosure, respectively. The process of S2 is an example of code acquisition process of the present disclosure. The process of S16 is an example of specifying process of the present disclosure. The process of S36 is an example of printing process of the present disclosure. The process of S33 is an example of order specifying process of the present disclosure. The process of S12 is an example of generation identification code printing process of the present disclosure. S39 to S41 are an example of switching process of the present disclosure. S21, S25, and S26 are an example of editing process of the present disclosure.

Effects of the above embodiment will be described using the printer 1 of the first specific example as an example. The same effects can be obtained in the printer 101 of the second specific example. The printer 1 includes the print head 10 and the CPU 91. The CPU 91 acquires the code information obtained from the one read identification code C1 (S2). The CPU 91 specifies, based on the code information J1, a plurality of pieces of print data including the first print data D1, and the second print data D2 and the third print data D30 different from the first print data D1 (S16). The CPU 91 drives the print head 10 to print the label L1 based on the first print data D1 specified in S16, the label L2 based on second print data D2 specified in S16, and the label L3 based on the third print data D30 specified in S16 (S36). The printer 1 can specify the first print data D1, the second print data D2, and the third print data D30 based on the one read identification code C1. The printer 1 can save the user the trouble of individually specifying the first print data D1, the second print data D2, and the third print data D30. When it is expected to reprint a plurality of pieces of print data printed in the past, the user affixes a label on which the identification code C1 corresponding to the plurality of pieces of print data prepared in advance is printed to a predetermined location. At the timing of reprinting, the printer 1 can reprint the plurality of pieces of print data only by acquiring the code information obtained from the identification code C1 read by the reader R. The plurality of pieces of print data is not limited to the print data printed by the printer 1 in the past, and may be the print data printed by another printer, or may be the print data generated as print data before printing. Therefore, according to the printer 1 of the present embodiment, it is possible to improve the convenience for the user at the time of printing as compared with the related art.

The printer 1 includes the ROM 92 which stores a plurality of pieces of print data. In the process of S16, the CPU 91 specifies a plurality of pieces of print data including the first print data D1, the second print data D2, and the third print data D30 designated by the code information J1, from among the plurality of pieces of print data stored in the ROM 92 (S5: YES, S16). The printer 1 can automatically specify the first print data D1, the second print data D2, and the third print data D30 designated by the code information J1 from among the plurality of pieces of print data stored in the ROM 92. The printer 1 can improve the convenience for the user in specifying the plurality of pieces of print data including the first print data D1, the second print data D2, and the third print data D30 from among the plurality of pieces of print data stored in the ROM 92 and perform printing as compared with the related art.

In the printer 1, the print sequence storage area 89 of the ROM 92 stores a plurality of pieces of print sequence information including the print sequence information 71 that specifies the print sequence of the first print data D1, the second print data D2, and the third print data D30. In the process of S16, the CPU 91 specifies the first print data D1 and the second print data D2 based on the print sequence information 71 designated by the code information J1, from among the plurality of pieces of print sequence information stored in the ROM 92 (S16). The printer 1 can automatically specify, based on the print sequence information 71, a plurality of pieces of print data including the first print data D1, the second print data D2, and the third print data D30 designated by the code information J1, from among the plurality of pieces of print data stored in the ROM 92. The printer 1 can improve the convenience for the user in specifying the first print data D1, the second print data D2, and the third print data D30 from among the plurality of pieces of print data stored in the ROM 92 and performing printing as compared with the related art.

In the printer 1, the CPU 91 specifies, based on the code information J1, the order of printing the label L1 based on the first print data D1 and the order of printing the label L2 based on the second print data D2 (S33). Based on the order specified in S33, the CPU 91 performs printing of the label L1 based on the first print data D1 in preference to the printing of the label L2 based on the second print data D2 and the label L3 based on the third print data D30 (S36). The printer 1 can print the label L1 and the label L2 in the printing order specified based on the code information J1. As compared with a case where the printing order is not specified, the printer 1 can improve the convenience for the user in specifying the first print data D1, the second print data D2, and the third print data D30 from among the plurality of pieces of print data stored in the ROM 92 and performing printing.

The code information J1 includes the first information Q2 for generating the first print data D1, the second information Q3 for generating the second print data D2, and the third information Q4 for generating the third print data D30. The CPU 91 specifies by generating the first print data D1 based on the first information Q2, generating the second print data D2 based on the second information Q3, and generating the third print data D30 based on the third information Q4 (S7, S9, S15, S16). Even when the first print data D1, the second print data D2, and the third print data D30 are not stored in the printer 1 since the print data could not be stored in the previous printing or the printer 1 different from the printer 1 that performed the previous printing is used, the printer 1 can reconstruct the first print data D1 based on the first information Q2 obtained from the code information J1, reconstruct the second print data D2 based on the second information Q3, and reconstruct the third print data D30 based the third information Q4.

When the first print data D1, the second print data D2, and the third print data D30 can be acquired from the ROM 92 based on the print sequence information 71 designated by the code information J1 (S5: YES), the CPU 91 acquires the first print data D1, the second print data D2, and the third print data D30 stored in the ROM 92 (S16), and when the first print data D1, the second print data D2, and the third print data D30 cannot be acquired from the ROM 92 (S5: NO), the CPU 91 reconstructs and acquires the first print data D1, the second print data D2, and the third print data D30, based on the code information J1 (S7, S9, S15, S16). The printer 1 can switch a method for specifying the first print data D1 and the second print data D2 depending on whether the first print data D1, the second print data D2, and the third print data D30 are stored in the ROM 92. The printer 1 can print the label L1 and the label L2 by preferentially using the first print data D1, the second print data D2, and the third print data D30 stored in the ROM 92. Among the first print data D1, the second print data D2, and the third print data D30, the printer 1 may acquire the print data stored in the ROM 92 from the ROM 92, and may reconstruct and acquire the print data not stored in the ROM 92 from the code information J1.

When the first print data D1, the second print data D2, and the third print data D30 cannot be acquired from the ROM 92 (S5: NO), and when the ROM 92 does not have a sufficient capacity to store the first print data D1, the second print data D2, and the third print data D30 (S6: NO), the CPU 91 generates a generation identification code including the information for generating one or more pieces of print data stored in the ROM 92 (S11), drives the print head 10, and prints the generation identification code on a label (S12). The CPU 91 deletes the print data corresponding to the generation identification code (S14), and stores the first print data D1, the second print data D2, and the third print data D30 generated based on the code information J1 in the ROM 92 (S15). When the ROM 92 does not have a sufficient capacity to store the first print data D1, the second print data D2, and the third print data D30, the printer 1 can secure a storage capacity of the ROM 92 and store the first print data D1, the second print data D2, and the third print data D30. The print data deleted to secure the storage capacity can be restored in the ROM 92 after the printing process of the first print data D1, the second print data D2, and the third print data D30 is completed by reading the corresponding generation identification code. The printer 1 may secure a storage capacity for storing the print data that is not stored in the ROM 92 among the first print data D1, the second print data D2, and the third print data D30, and may accordingly generate a generation identification code including the information for generating the print data stored in the ROM 92.

The identification code C1 includes the mode information Q5. Based on the mode information Q5, the CPU 91 switches whether to store the first print data D1 and the second print data D2 printed in S61 in the ROM 92 (S39 to S41). The printer 1 can automatically switch whether to store the first print data D1, the second print data D2, and the third print data D30 in the ROM 92 based on the mode information Q5. The printer 1 can save the user the trouble of determining whether to store the first print data D1, the second print data D2, and the third print data D30 in the ROM 92.

The CPU 91 receives editing of at least one of the first print data D1, the second print data D2, or the third print data D30 specified in the process of S16 as data to be edited (S21: YES, S25, S26). When editing of any one of the first print data D1, the second print data D2, and the third print data D30 is executed, the CPU 91 drives the print head 10 to print a label based on the data to be edited instead of printing at least one of the label L1 based on the first print data D1, the label L2 based on the second print data D2, or the label L3 based on the third print data D30 (S36). The printer 1 can edit either the first print data D1 or the second print data D2 generated based on the code information J1 as the data to be edited. When the editing process is executed in S26, the printer 1 can print a label based on the edited data to be edited. The printer 1 can improve the convenience for the user in printing the first print data D1, the second print data D2, and the third print data D30 as compared with a case where the first print data D1 and the second print data D2 generated based on the code information J1 cannot be edited. For example, even in reprinting using a common format, such as re-sticking of a label when the print content printed on a label is changed, the printer 1 can easily generate a label for re-sticking by editing based on the first print data D1 and the second print data D2 generated based on the code information J1.

The identification code C1 including the information specifying the first print data D1, the second print data D2, and the third print data D30 printed on a third label by the print head 10 is generated (S68), and is printed on the third label by driving the print head 10 (S69). The printer 1 can generate the identification code C1 including the information specifying the first print data D1, the second print data D2, and the third print data D30, and can print the generated identification code C1 on the third label. The printer 1 can save the user the trouble of printing the identification code C1 including the information specifying the first print data D1, the second print data D2, and the third print data D30.

The printer of the present disclosure is not limited to the above embodiment, and various modifications may be added without departing from the gist of the present disclosure. For example, the following modifications may be appropriately added.

The present disclosure can be executed in various aspects, for example, may be implemented in the form of a printing program executed by a controller of a printer, a non-transitory computer readable medium storing a printing program, a printing method, a printing system including an editing device and a printer, and the like.

(A) The configurations of the printer 1 and the printer 101 may be appropriately changed. The reader R may be a smartphone including a camera, a mobile terminal, or the like. The storage may be a readable and writable storage device, and may be another storage device such as an HDD or an SSD in addition to the ROM 92. The printer 1 and the printer 101 may be printers that print a label by printing on a medium different from the medium 50 fed from the cassette 30 attached to the cassette attachment portion 8. For example, the printer 1 and the printer 101 may each be a printer that creates a label by printing on a tape wound in a roll shape, or may be a printer that creates a label by printing on fanfold paper. At least one of the printer 1 or the printer 101 may include the reader R or a camera and acquire code information obtained by reading one identification code via the reader R or the camera.

Figure 6:
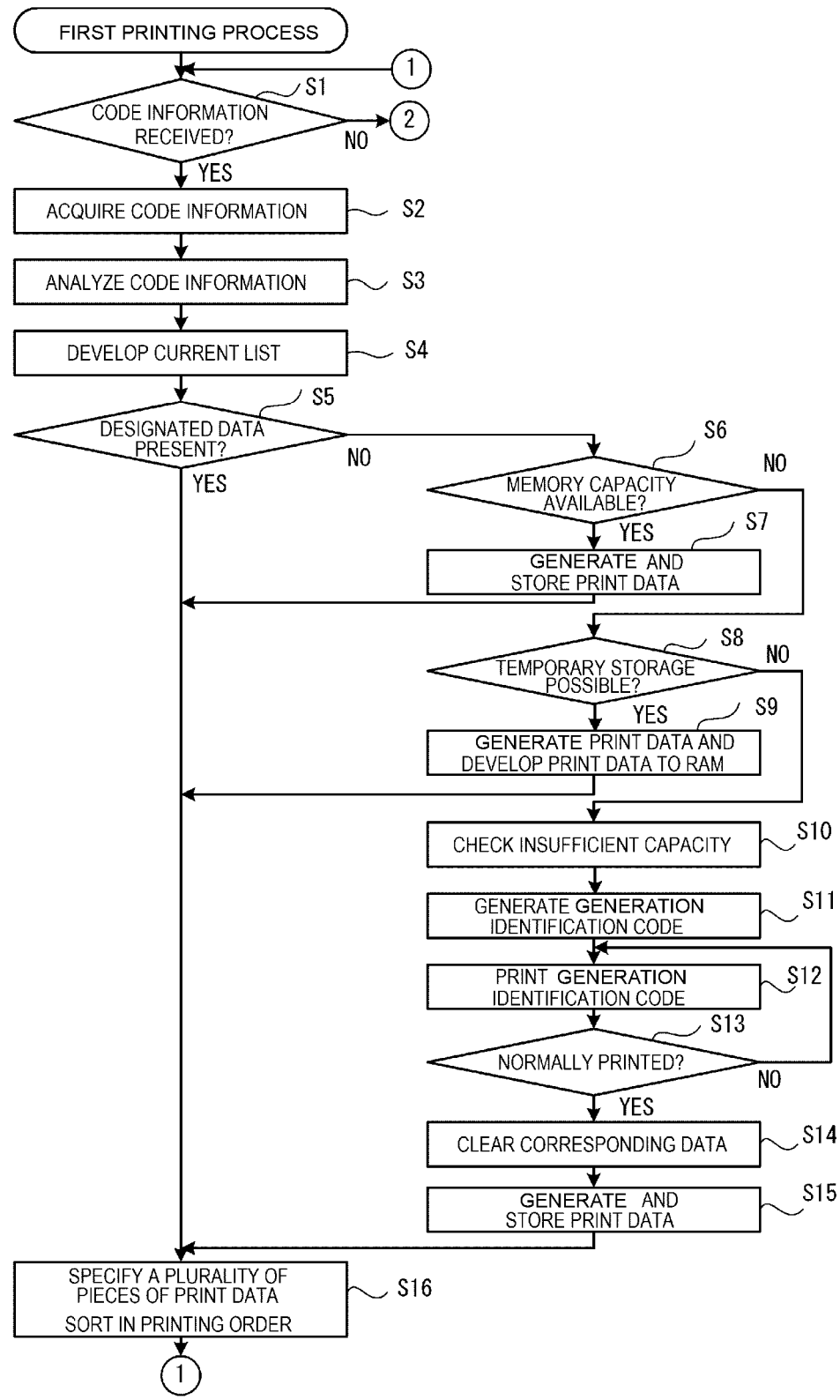
FIG. 6 is a part of a flowchart of first printing process.
Figure 10:
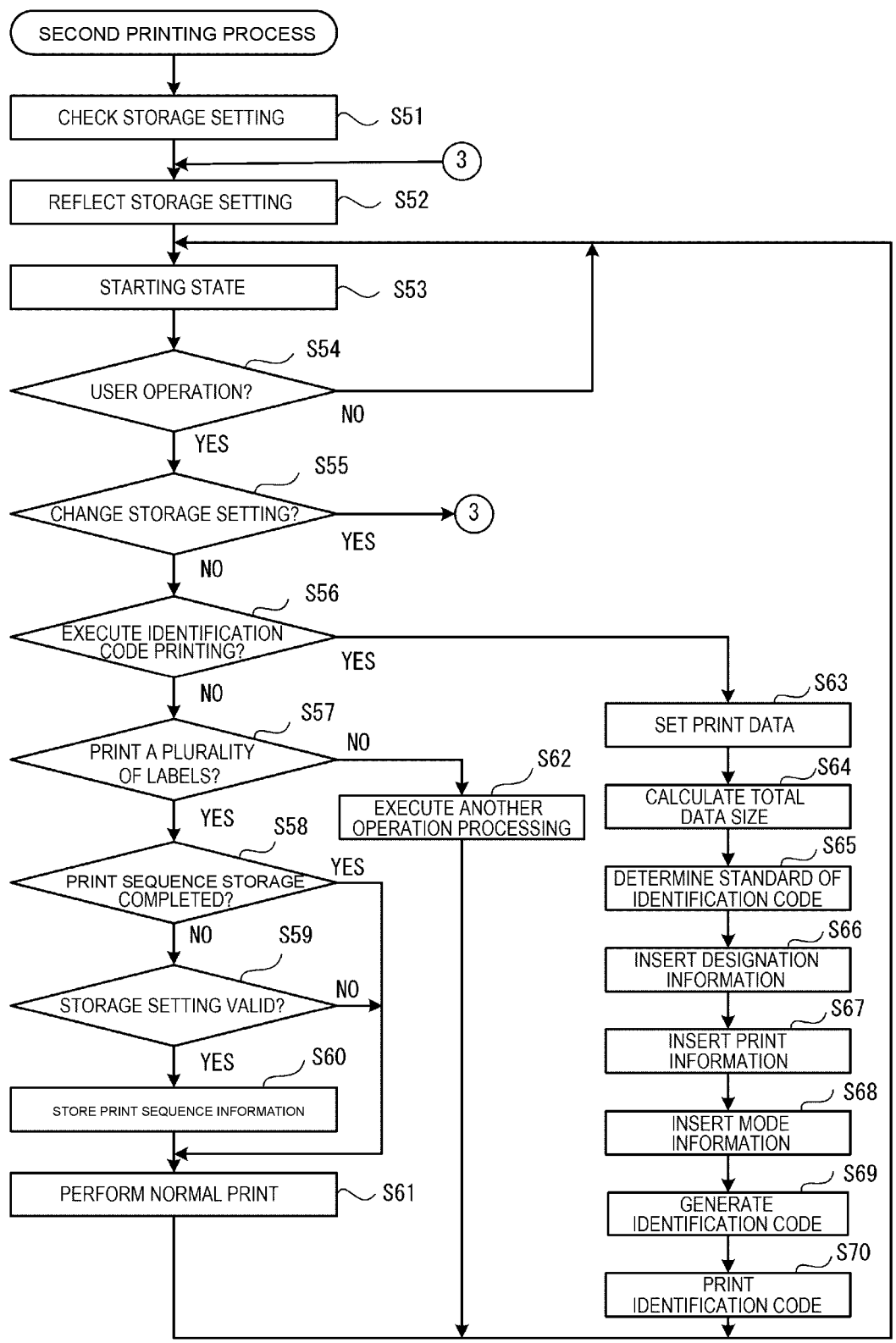
FIG. 10 is a flowchart of second printing process.

(B) The programs including instructions for executing the first printing process of FIGS. 6 and 7 and the second printing process of FIG. 10 may be stored in the ROM 92 until the CPU 91 of the printers 1 and 101 executes the programs. A method and route of acquiring the programs, and a device storing the programs may be changed as appropriate. The programs executed by each device may be received from other devices via a cable or wireless communication and stored in a storage device such as a storage. The other devices include, for example, a PC and a server connected via a network.

(C) The steps of the first printing process and the second printing process are not limited to the example executed by the CPU 91, and part or all of the steps may be executed by other electronic devices (for example, an ASIC). The steps of the first printing process and the second printing process may be distributed and processed by a plurality of electronic devices (for example, a plurality of CPUs). The order of the steps of the first printing process and the second printing process can be changed, and the steps can be omitted and added as necessary. The following modifications may be appropriately added to the first printing process and the second printing process.

The code information may not include at least one of the printing order, the first information, the second information, or the mode information. The code information may include the first print sequence information instead of the designation information. In this case, the printers 1 and 101 may omit the process of S51, S52, S55, and S58 to S60 as appropriate, and may not include the print sequence storage area 89. The process of S66 to S68 may be changed as appropriate according to the information included in the code information. The order of inserting the information included in the code information in the code information may be changed as appropriate. The CPU 91 may determine the type of data included in the code information according to the data size calculated in S62. More specifically, when the data size calculated in S62 is larger than a maximum data size that can be included in the identification code of the standard determined in S63, the CPU 91 may not include the printing information including the first information and the second information in the code information. The information stored in the print sequence storage area 89 may be changed as appropriate as long as the information includes the information specifying a print sequence of a plurality of pieces of print data including the first print data and the second print data. The code information may include printing information for generating print data for part of the plurality of pieces of print data specified based on the print sequence information. The identification code may be a character string such as an ID of the print sequence information. In this case, the reader R may be a camera, and the printer 1 may specify the character string by performing OCR on the image data.

When the code information does not include the printing order, in S33, the CPU 91 may acquire the printing order and the number of copies of the first print data and the printing order and the number of copies of the second print data from the user, or may automatically set the printing order in the ID order or the storage order of the print data. The number of print data specified based on the code information in S16 may be two or more, and may be four or more. When the code information includes the first information and the second information, the CPU 91 may reconstruct the first print data based on the first information and reconstruct the second print data based on the second information regardless of whether each of the first print data and the second print data designated based on the first print sequence information is stored in the ROM 92. When the code information does not include the mode information, in S39, the CPU 91 may uniformly set whether to store each of the first print data generated based on the first information and the second print data generated based on the second information in the ROM 92, or may set by acquiring a user instruction. Similarly, in S27, the CPU 91 may uniformly set whether to overwrite the edited first print data or the edited second print data in the ROM 92 or store the edited first print data or the edited second print data under another name, or may set by acquiring a user instruction.

When the ROM 92 does not have a sufficient capacity to store the first print data and the second print data (S6: NO), the CPU 91 may display an error on the display unit 5 and stop the subsequent process, or may receive a designation of data to be deleted from the data stored in the ROM 92 from the user and continue the process. The CPU 91 may omit the process of S21 and S25 to S28, and may not receive editing of either the first print data or the second print data. The process of generating and printing one identification code executed in the second printing process of FIG. 10 (S69, S70) may be executed by a printer different from the printer that executes the first printing process of FIGS. 6 and 7. In this case, the CPU 91 may not execute the second printing process. In S70, the CPU 91 may print additional information such as the date and time of printing and a user name together with the identification code.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

What is claimed is:

1. A printer comprising:
    a print head configured to perform printing;
    a controller configured to control the print head;
    a memory configured to store a plurality of pieces of print data including the first print data and the second print data,
    wherein the controller is configured to execute:
        code acquisition process of acquiring code information obtained from an identification code,
        specifying process of specifying, based on the code information, first print data and second print data different from the first print data, and
        printing process of printing a first label based on the first print data specified in the specifying process and printing a second label based on the second print data specified in the specifying process by controlling the print head,
    wherein, in the specifying process, the controller specifies the first print data and the second print data designated by the code information from among the plurality of pieces of print data stored in the memory,
    wherein the memory is further configured to store a plurality of pieces of print sequence information including first print sequence information specifying a print sequence of the first print data and the second print data,
    wherein, in the specifying process, the controller specifies, based on the first print sequence information designated by the code information, the first print data and the second print data from among the plurality of pieces of print sequence information stored in the memory,
    wherein the controller is further configured to execute:
        determination process of determining whether the first print data and the second print data are acquirable from the memory based on the first print sequence information designated by the code information;
        first acquiring process of acquiring, in a case where the first print data and the second print data are determined to be acquirable in the determination process, the first print data and the second print data from the memory to specify the first print data and the second print data in the specifying process; and
        second acquiring process of acquiring, in a case where the first print data and the second print data are determined to be non-acquirable in the determination process, the first print data and the second print data by generating the first print data and the second print data based on the code information to specify the first print data and the second print data in the specifying process, and
    wherein, in a case where (i) the first print data and the second print data are non-acquirable from the memory and (ii) the memory does not have a sufficient capacity to store the first print data and the second print data, the controller is configured to generate a generation identification code including information for generating one or more pieces of print data stored in the memory, the controller is configured to execute:
        driving process of driving the print head to execute generation identification code printing process for printing the generation identification code on a third label;
        deleting process of deleting print data corresponding to the generation identification code; and
        storing process of storing the first print data and the second print data generated based on the code information in the memory.

2. The printer according to claim 1,
    wherein the controller is further configured to execute order specifying process of specifying, based on the code information, an order of printing the first label based on the first print data and an order of printing the second label based on the second print data, and
    wherein, in the printing process, the controller performs the printing of the first label and the printing of the second label, based on the order specified by the order specifying process.

3. The printer according to claim 1,
    wherein the code information includes first information for generating the first print data and second information for generating the second print data, and
    wherein, in the specifying process, the controller specifies the first print data and the second print data by generating the first print data based on the first information and the second print data based on the second information.

4. The printer according to claim 1,
    wherein the identification code includes mode information, and
    wherein the controller is further configured to execute, based on the mode information, switching process for switching whether to store the first print data and the second print data subjected to the printing process in the memory.

5. The printer according to claim 1,
    wherein the controller is further configured to execute editing process of accepting editing of at least one of the first print data or the second print data specified in the specifying process as edited data, and wherein, in a case where the editing process is executed, the controller executes printing of a third label based on the edited data instead of at least one of the printing of the first label based on the first print data or the printing of the second label based on the second print data.

6. The printer according to claim 1,
wherein the controller is further configured to execute identification code printing process, in which the controller generates a second identification code including information specifying the first print data printed on the first label and the second print data printed on the second label to print the second identification code on a third label.

* * * * *